Patented Apr. 30, 1929.

1,710,967

UNITED STATES PATENT OFFICE.

WALLER CROW, OF CHICAGO, ILLINOIS, ASSIGNOR, BY DIRECT AND MESNE ASSIGNMENTS, TO DITTLINGER-CROW COMPANY, OF NEW BRAUNFELS, TEXAS, A CORPORATION OF TEXAS.

PROCESS OF CALCINING ALKALINE EARTH MATERIALS.

No Drawing.        Application filed March 5, 1923. Serial No. 623,024.

This invention relates to the treatment of materials decomposable by heat. A number of substances are decomposed by heat with the formation of useful products. One of the best examples of such substances are the carbonates of the alkali earth metals, calcite and magnesite, and rocks containing one or both these substances. Another example is calcium nitrate which by the action of heat may be converted into calcium oxide.

Among the objects of this invention are the provision of improved methods of treating materials decomposable by heat; the provision of improved methods of decomposing carbonates; the provision of improved methods of producing metallic hydroxides and oxides; the provision of means whereby the calcination of carbonates and other substances may be carried out more cheaply and efficiently than heretofore; the provision of means whereby the heat treatment of materials may be more accurately controlled than heretofore.

Other and further important objects of this invention will be apparent from the disclosures in the following specification.

The customary method of treating calcite and magnesite to convert them into oxide containing products is to burn them in a kiln. In these kilns hot products of combustion pass through the mass and carry off the carbon dioxide gas liberated by heat.

Now the products of combustion of coal contain a considerable percentage of carbon dioxide which inhibits the liberation of carbon dioxide from the carbonates so that a higher temperature is required to decompose the latter than would otherwise be the case.

I have found, however, that the lower the temperature at which the decomposition can be carried out the better is the resulting product. Hard burnt lime, or lime which has been burnt at a high temperature, will ring when struck by a hammer, whereas soft burnt lime will not do so. This difference is believed to be due to the sintering together of the particles by fusible impurities in the limestone. In practice it is found that hard burnt lime as ordinarily slacked does not give the soft amorphous hydroxide obtainable with soft burnt lime but a more crystalline product, although the crystals are microscopic in size.

Consequently, according to my invention I carry out the heat treatment in such a manner that the temperature may be carefully and accurately controlled. Further, I prefer to carry out the treatment with hot gases which are substantially free from carbon dioxide.

I have also found that if the gases used are first superheated steam and then heated air a better product can be obtained than by the use of hot air only.

I believe that one advantage of using steam is to enable the decomposition to take place more readily on account of the formation of hydroxide instead of or in addition to oxide. In the case of calcite or limestone the reaction being:

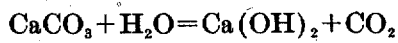
$$CaCO_3 + H_2O = Ca(OH)_2 + CO_2$$

For ordinary purposes, however, the final product desired is the oxide and not the hydroxide. Consequently this preliminary steam treatment is followed by a secondary treatment by hot air which results in the dehydration of the hydroxide produced by the steam

$$Ca(OH)_2 = CaO + H_2O$$

The beneficial effect of steam is probably also due in part to the greater volume of the hydroxide as compared with the oxide which causes the mass to swell somewhat as the carbonate is converted into hydroxide.

The swelling when hydroxide is formed and the shrinkage when oxide is formed is due to the fact that when 100 grams of calcite occupying a volume of about 36.8 cc. are treated with steam the resulting 74.1 grams of hydroxide occupy 35.7 cc. or substantially the same volume as the original carbonate, whereas the final oxide product has a volume of only 16.95 cc. or less than half that of the carbonate. The hydroxide will not occupy exactly the same positions in the mass as the crystals of calcite with the result that slight swelling occurs. Even with a slight swelling, however, the mass contains a much smaller proportion of voids than when oxide is formed. This means that as a result of the steam treatment the mass is relatively free from voids in which carbon dioxide may be retained. When the oxide is formed directly from the carbonate, a porous mass containing a large percentage of voids is obtained from the pores of which carbon dioxide can only be expelled by an excessive amount of heat.

A further advantage of the swelling which occurs as the result of the steam treatment is that it aids in the breaking up of the lumps of calcite and in the subsequent penetration of the steam to the heart of each lump and particle of calcite.

The dehydration of the hydroxide takes place at a lower temperature than the direct decomposition of the calcite to oxide so that the entire treatment may be carried out at a lower temperature than has heretofore been practical using the kiln process.

Similar volume relations hold in the case of magnesite. In this case 100 grs. of $MgCO_3$ occupy 32.9 cc. and yield 69.2 grs. of $Mg(OH)_2$ occupying 29.3 cc. and give as a final product 47.5 grs. of MgO occupying 13.84 cc.

A further advantage of the present method of treatment by heated gases over the old kiln process is that it enables the treatment to be more accurately controlled both as to temperature and time. This is particularly important in connection with rocks containing both calcite and magnesite. In mortar MgO sets more slowly than CaO and I have found that calcite has the effect of retarding the setting of MgO. Consequently I prefer in treating such mixed carbonates to convert substantially all the magnesite into magnesia while leaving a part of the calcite unchanged.

This is possible in view of the relationship between the heats of formation of the corresponding calcium and magnesium compounds. Thus the heat of formation of calcite from CaO and $CO_2$ is 43,300 calories as against 25,700 calories for the formation of magnesite from MgO and $CO_2$. Further the heat of calcium hydroxide from CaO and $H_2O$ (gas) is 25,800 calories as compared with 15,600 calories for the formation of magnesium hydroxide from MgO and $H_2O$ (gas). Consequently in the conversion of $CaCO_3$ into $Ca(OH)_2$ we have first an absorption of 43,300 calories and then an evolution of 25,800 calories or a net absorption of 17,500 calories. In changing $MgCO_3$ into $Mg(OH)_2$ we have first an absorption of 25,700 calories and then an evolution of 15,600 calories or a net absorption of 10,100 calories.

In general that reaction will take place first which involves the smallest absorption of heat. In the present case it will be the production of magnesium hydroxide during the steam treatment and magnesia during the hot air treatment. Further, in general the reaction which takes place with the smallest absorption of heat will take place at the lowest temperature. Hence the desired selective decomposition of the mixed carbonates can be carried out by suitably controlling both the time and temperature of treatment.

In carrying my invention into effect, using calcite or limestone as the material acted upon, I prefer to treat the calcite with superheated steam for 5 to 15 minutes followed by a hot air treatment. Good results have been obtained with steam at about 100 lbs. per sq. in. superheated about 150° C. so that its temperature is about 320° C. Preferably the steam temperature is between 250° C. and 375° C., although in some cases the temperature used may be as high as 500° C. The pressure is not so important as the temperature and steam at a pressure of only 5 or 10 lbs. per sq. in. may be employed in some cases. Increasing the pressure of the steam aids in the conversion of the carbonates into hydroxide by increasing the concentration of the molecules of $H_2O$ according to the mass action law. In the carrying out of the invention under the consideration that the pressure is not a material factor in the reaction, but that the temperature and the steam is doing the work herein, it is pointed out that in the high degrees of superheating and with a pressure up to 100 lbs. gage or 115 lbs. absolute approximate pressure whether or not there be the drop thereof say from 150° C. superheat to 5 lbs. gage or 20 lbs. approximately absolute pressure, with a slight drop in temperature and a most material increase in the superheat beyond that of the initial 150° C., the degree of heat carried by the steam is greatly in excess of the temperature of aqueous vapor or saturated steam at approximately atmospheric pressure.

The temperature of the hot air employed may conveniently be substantially the same as that of the steam.

The usual temperature in a lime kiln is around 1000° C. and I have found that not only is the reaction brought about at a much lower temperature by my process thereby greatly improving the quality of the product but the cost of treatment is also greatly reduced. Thus in an ordinary kiln the fuel ratio is about 1 lb. of coal to 3 of limestone, whereas in my process 1 lb. of coal suffices for the treatment of about 8 lbs. of limestone.

The calcite need not be heated prior to the introduction of the steam. The limestone is preferably crushed more finely than for kiln work where lumps 6 inches in diameter are usual practice. In my process I prefer to crush until all the rock will pass a 1 inch mesh screen.

Any suitable apparatus may be used for the treatment of the materials by the heated gases which will allow the latter proper access to the material.

While I have referred to the use of superheated steam followed by heated air, I may in some cases employ other gases, especially for the dehydration of hydroxide produced by steam, such as flue gases, blast furnace gases and the like. Preferably, however, the gas used is one which is substantially free from carbon dioxide or otherwise higher temperatures must be employed.

Further, where mixed carbonates are treated and too large a proportion of limestone is converted into oxide, a final treatment with a small amount of carbon dioxide may be employed to produce the requisite amount of calcium carbonate in the product.

Various other modifications and changes may also be made in my invention without departing from the principles of my invention, and I do not purpose limiting the patent granted hereon otherwise than as necessitated by the prior art.

I claim as my invention:

1. The process of treating carbonates of the alkaline earth metals by subjecting them first to superheated steam of a pressure about 100 lbs. per sq. in. and a temperature of about 320° C., and then to the action of air heated to a temperature high enough to decompose the hydroxide formed by the action of the superheated steam.

2. The process of calcining carbonates of the alkaline earth metals by subjecting them first to superheated steam of a pressure from 5# to 100# per sq. in. and to temperatures of from 250° to 500° C. whereby the carbonates are substantially converted to hydroxides, and then subjecting the latter to the action of air heated to a temperature high enough to decompose the said alkaline earth hydroxides, and yield the oxides thereof.

In testimony whereof I have hereunto subscribed my name.

WALLER CROW.

CERTIFICATE OF CORRECTION.

Patent No. 1,710,967.  Granted April 30, 1929, to

WALLER CROW.

It is hereby certified that the assignee in the above numbered patent was erroneously described and specified as "Dittlinger-Crow Company", whereas said assignee should have been described and specified as "Dittlinger-Crow Process Company", as shown by the records of assignments in this office; and that the said Letters Patent should be read with this correction therein that the same may conform to the record of the case in the Patent Office.

Signed and sealed this 28th day of May, A. D. 1929.

(Seal)

M. J. Moore,
Acting Commissioner of Patents.

gases which will allow the latter proper access to the material.

While I have referred to the use of superheated steam followed by heated air, I may in some cases employ other gases, especially for the dehydration of hydroxide produced by steam, such as flue gases, blast furnace gases and the like. Preferably, however, the gas used is one which is substantially free from carbon dioxide or otherwise higher temperatures must be employed.

Further, where mixed carbonates are treated and too large a proportion of limestone is converted into oxide, a final treatment with a small amount of carbon dioxide may be employed to produce the requisite amount of calcium carbonate in the product.

Various other modifications and changes may also be made in my invention without departing from the principles of my invention, and I do not purpose limiting the patent granted hereon otherwise than as necessitated by the prior art.

I claim as my invention:

1. The process of treating carbonates of the alkaline earth metals by subjecting them first to superheated steam of a pressure about 100 lbs. per sq. in. and a temperature of about 320° C., and then to the action of air heated to a temperature high enough to decompose the hydroxide formed by the action of the superheated steam.

2. The process of calcining carbonates of the alkaline earth metals by subjecting them first to superheated steam of a pressure from 5# to 100# per sq. in. and to temperatures of from 250° to 500° C. whereby the carbonates are substantially converted to hydroxides, and then subjecting the latter to the action of air heated to a temperature high enough to decompose the said alkaline earth hydroxides, and yield the oxides thereof.

In testimony whereof I have hereunto subscribed my name.

WALLER CROW.

CERTIFICATE OF CORRECTION.

Patent No. 1,710,967.    Granted April 30, 1929, to

WALLER CROW.

It is hereby certified that the assignee in the above numbered patent was erroneously described and specified as "Dittlinger-Crow Company", whereas said assignee should have been described and specified as "Dittlinger-Crow Process Company", as shown by the records of assignments in this office; and that the said Letters Patent should be read with this correction therein that the same may conform to the record of the case in the Patent Office.

Signed and sealed this 28th day of May, A. D. 1929.

(Seal)

M. J. Moore,
Acting Commissioner of Patents.